Sept. 15, 1931.          G. A. DE VLIEG          1,823,032
                              TOOL HOLDER
                    Filed June 26, 1926      2 Sheets-Sheet 1

Inventor
Gerard A. DeVlieg
By Churchill, Parker & Carlson
Att'ys.

Patented Sept. 15, 1931

1,823,032

UNITED STATES PATENT OFFICE

GERARD A. DE VLIEG, OF ROCKFORD, ILLINOIS

TOOL HOLDER

Application filed June 26, 1926. Serial No. 118,639.

The present invention relates to improvements in holders for cutting tools, such as reamers and the like, and permitting self-centering of the tools.

The purposes of reaming are to obtain smoothness of surface, axial alignment, and roundness of the bore. These purposes are difficult to attain because of alignment errors inherent in machine tool constructions. To permit alignment from the hole to be reamed instead of from some outside point, floating. or self-centering tool holders for reamers have been provided. Heretofore, such holders have not been entirely satisfactory either because they have been complicated or expensive, or because the reamer and the means for accomplishing self-centering have been spaced too far apart.

The primary object of the invention, therefore, is to provide a new and improved tool holder of the above character in which the means for accomplishing the self-centering is positioned closely to the cutting portion of the tool.

Other objects are to provide a novel floating or self-centering tool holder which is simple in construction and operation, which is inexpensive, and in which the bearing surfaces of the parts permitting self-centering are rounded to permit a relative rolling action without backlash.

Further objects and advantages will become apparent as the description proceeds.

In the accompanying drawings, Figure 1 is a longitudinal sectional view of a tool holder embodying the features of my invention and a reamer thereon.

Figure 1:
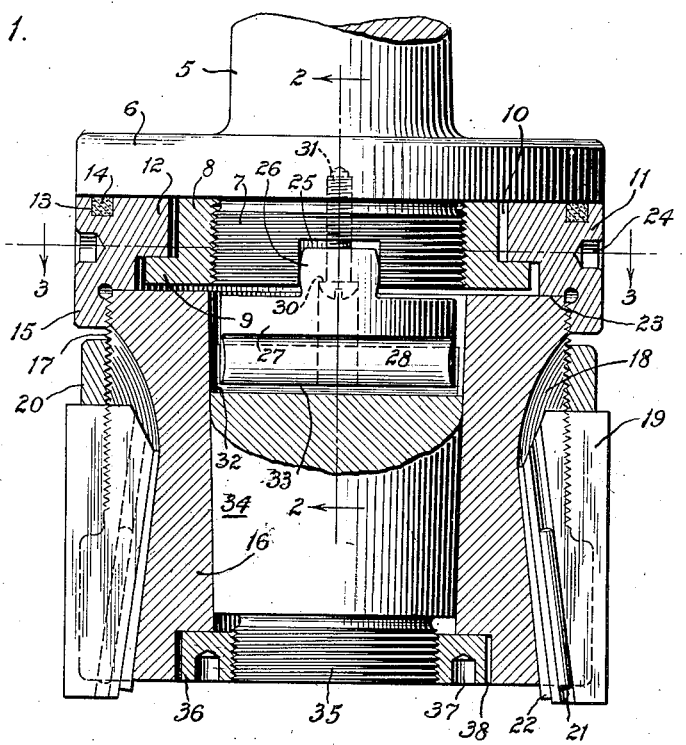
Figure 2:
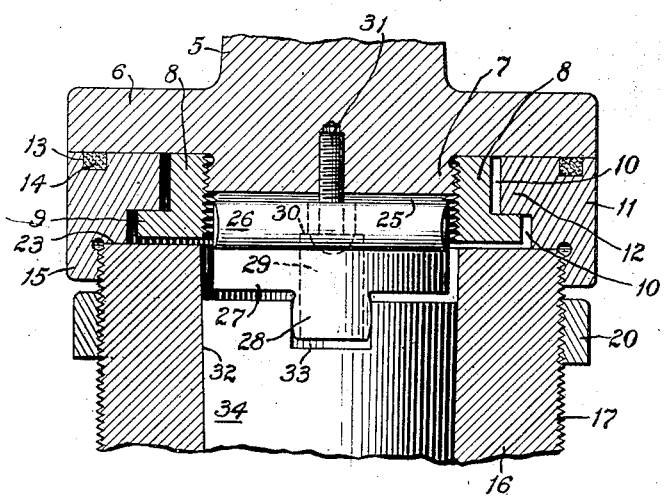
Fig. 2 is a fragmentary sectional view taken along line 2—2 of Fig. 1.
Figure 3:
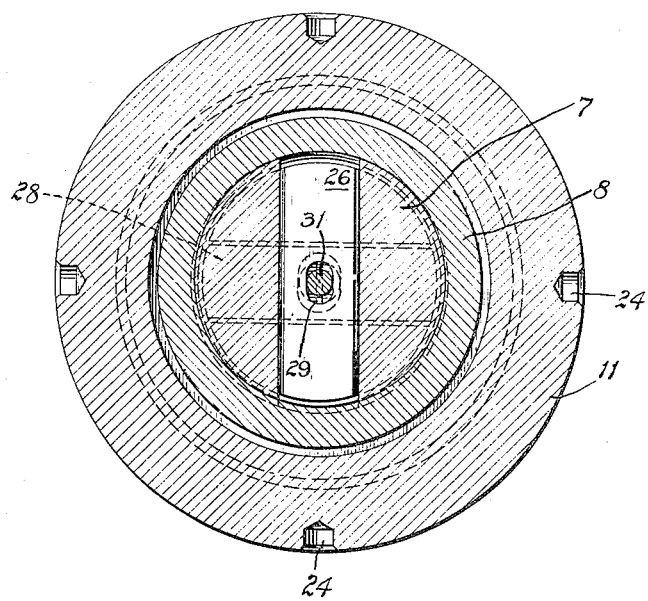
Fig. 3 is a sectional view taken along line 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

The exemplary embodiment of the invention comprises a shank 5 which is adapted to be connected to a suitable source of power, and which preferably is tapered to fit into a suitable socket (not shown). The outer end of the shank is formed integral with a circular face plate 6 on the front face of which an externally threaded boss 7 is centrally formed.

Figure 4:
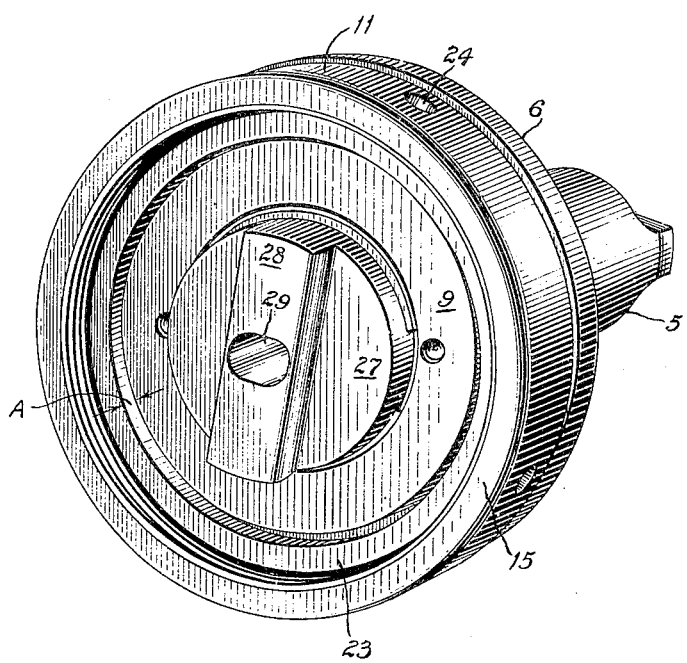
Fig. 4 is a perspective view of the tool holder.

An inner collar 8 is threaded onto the boss 7 and is formed at its end with an outer peripheral flange 9. The plate 6 and the flange 9 define an annular notch or space 10. Fitting against the face plate 6 is an outer collar 11 having an inner peripheral flange 12 fitting into the annular space 10. The inner collar 8 preferably is of such length that when screwed against the face plate 6, the flange 9 will engage the flange 12 and hold the latter in engagement with said plate. The internal diameter of the collar 11 is such that a clearance A (see Fig. 4) is provided between it and the inner collar 8 to permit the collar 11 to move laterally in the space 10. In the inner end of the outer collar 11 is an annular notch 13 which is filled with suitable packing material 14 adapted to prevent dust and other foreign matter from entering the space 10.

The outer end of the collar 11 is formed with an annular internally threaded flange 15 which is adapted to receive the body of the cutter or tool. In the present instance, I have shown a reamer of the expansion type similar to the reamer disclosed in my copending application Serial No. 752,322 filed November 26, 1924, (Patent No. 1,723,017) and comprising a body 16 provided with threads 17 on its inner end. The body 16 is formed with a plurality of longitudinal slots 18 in which cutting blades 19 are secured. The inner ends of the blades abut against a nut 20 adjustable on the threaded portion of the body 16. The blades are held in position against the nut 20 by means of pins 21 and wedges 22. While I have shown the above type of expansion reamer, particularly because it is adapted to ream the cylinder bores of internal combustion engines where accuracy and hence alignment of the reamer with the bores are necessary, it is to be understood that any other suitable type of reamer or cutter may be secured to the tool holder.

The body 16 is threaded into the flange 15 and against a shoulder 23 at the inner end of said flange. The outer collar 11 is provided in its outer periphery with a plurality of holes 24 adapted to be engaged by a suitable spanner wrench (not shown) for turning the collar to secure the body 16 thereto. The face plate 6, inner collar 8 and outer collar 11 thus constitute means for securely connecting the cutter to the shank 5, and yet permitting free lateral and rotary movement.

Means is provided connecting the shank 5 to the body 16 of the cutter to effect a driving connection permitting lateral movement of the cutter in any direction but preventing rotary movement thereof relative to the holder. To this end, the boss 7 is formed with a diametrical slideway 25 in which a slide 26 formed on the rear side of an aligning member 27 is slidably disposed. The front face of the member 27 is formed with a diametrical slide 28 similar to the slide 26 but extending perpendicularly thereto. The member 27 is preferably circular in shape, and is smaller in diameter than the boss 7 to permit lateral movement in the slideway 26.

To secure the member 27 loosely to the boss 7, it is formed with an elliptical slot 29 which extends therethrough with its major axis parallel to the slide 26, and which at its inner end is reduced in size to provide a shoulder 30. A screw 31 extends through the slot 29 with its head engaging the shoulder 30, and is threaded into the center of the boss 7.

The member 27 is located in a bore 32 in the body 16, which is substantially larger in diameter than the member to permit free lateral movement of the latter therein. The slide 28 engages a diametrical slideway 33 which may be formed in the body 16, but which preferably is formed in the inner end of a member 34 positioned in the outer end of the bore 32. The bore 32 and the member 34 are tapered outwardly to provide a tight driving fit when said member is drawn outwardly. To clamp the member 34 to the body 16, said member is formed on its outer end with a reduced threaded portion 35. A lock nut 36 having suitable openings 37 for a spanner wrench (not shown) is threaded onto the portion 35 and engages an annular counterbore 38 in the outer end of the body 16. The sides of the slides 26 and 28 are rounded and the slideways 25 and 33 are of sufficient depth to permit lateral rolling motion of the member 27.

In assembling the tool holder, the outer collar 11 is positioned against the face plate 6, and the inner collar 8 is then threaded onto the stud 7 to clamp the flange 12 between the flange 9 and the front face of the plate. The aligning member 27 is then loosely attached to the stud 7 by means of the screw 31. To mount the cutter on the holder, the body 16 is now secured to the flange 15 by turning the outer collar 11. In positioning the body 16 against the holder, the slideway 33 is disposed to receive the slide 28. After the body 16 has been secured to the collar 11, the member 34 is clamped to the body 16 by tightening the nut 35, thereby completing a positive driving connection through said member, the aligning member 27 and the boss 7.

It will be apparent that the cutter is free to move laterally in any direction to obtain proper self-alignment. If alignment is necessary along either of the slides 26 and 28, that slide will move along its slideway. If alignment is required in any other direction, both slides will tilt or roll in their slideways to produce alignment. The means permitting the floating or aligning action of the cutter is located almost entirely within the body of the cutter, and hence is next to the cutting portion of the cutter. The work holder is simple and inexpensive in construction and efficient and accurate in operation.

I claim as my invention:

1. A tool holder having, in combination, a shank having a face plate formed integral therewith, a threaded stud formed centrally on said face plate and having a diametrical slideway, an outer collar having an inner peripheral flange bearing against said face plate, an inner collar threaded onto said stud and extending through said outer collar, a flange on said inner collar holding said first mentioned flange against said face plate, said collars being spaced peripherally to provide clearance permitting limited lateral movement of said outer collar, a flange on said outer collar adapted to receive the body of the tool, and an aligning member formed on opposite sides with slides extending perpendicularly to each other, one of said slides being disposed in said slideway, a clamping member adapted to be secured to said body and having a diametrical slideway in which the other of said slides is disposed, and means for clamping said clamping member to said body.

2. A tool holder having, in combination, a face plate, an externally threaded stud on said face plate, an outer collar, an inner collar threaded to said stud and holding said outer collar against said plate, said collars being spaced peripherally to provide clearance permitting lateral and rotary movement of said outer collar, means on said outer collar adapted to receive and support the body of the tool, and a driving connection between said stud and the tool, said driving connection permitting lateral movement of the tool in any direction.

3. A combined tool and holder having, in combination, a support, a threaded stud on said support, said stud having a diametrical slideway, a tool having a body with a plurality of cutting elements and formed with an axial outwardly tapered bore, means securing said body to said stud but permitting lateral movement in any direction and rotary movement of said body, a member having a conical surface seated in said bore and having a diametrical slideway in its inner end, and an aligning member having a pair of perpendicular slides respectively disposed in said slideways.

4. A combined tool and holder having, in combination, a support, a diametrical slideway in said support, a tool having a body with a plurality of cutting elements and formed with an axial bore, means securing said body to said support but permitting free lateral movement thereof in any direction, a member seated in said bore and having a diametrical slideway in its inner end, and a floating aligning member having a pair of perpendicular slides respectively disposed in said slideways, said aligning member being located within said bore.

5. A tool holder having, in combination, a supporting member having a face plate, a collar secured to said member, a second collar concentric with said first mentioned collar and loosely secured thereby against said face plate for lateral movement, said last mentioned collar being adapted to removably support the body of the tool, and aligning means for connecting the body of the tool to said support, said last mentioned means preventing relative rotary movement between the tool and said support so as to constitute a drive connection.

6. A combined tool and holder having, in combination, a supporting member, means on said member for rotation therewith and having a diametrical slideway, a tool having a central bore, a member removably secured in said bore and having a diametrical slideway at its inner end, means for removably securing said body to said member but permitting relative lateral movement in any direction, and a drive member located mainly in said bore and having mutually perpendicular slides respectively engaging said slideways.

7. A tool holder having, in combination, a support comprising a face plate, a central member on said face plate, an outer collar having an inner peripheral flange bearing against said face plate, an inner collar secured to said member and having a flange overlapping with said first mentioned flange to hold the latter against said face plate, said collars being spaced peripherally to provide clearance permitting limited lateral movement of said outer collar, means for securing the body of the tool to said outer collar and an aligning member having a sliding connection with said first mentioned member and adapted to have sliding connection with the tool, the connections being disposed at right angles.

8. A tool holder having, in combination, a supporting member having a peripheral enlargement defining an end mounting face and having a cylindrical axial extension projecting forwardly from said face, means removably secured to said extension and having a peripheral retaining flange adapted to extend in overlapping engagement with a part on the tool to secure the latter slidably against said face, and universal drive means for transmitting rotation of said extension to the tool, said last mentioned means permitting relative lateral movement of the tool on said face.

In testimony whereof, I have hereunto affixed my signature.

GERARD A. DE VLIEG.